United States Patent [19]
May et al.

[11] Patent Number: 5,971,470
[45] Date of Patent: Oct. 26, 1999

[54] FOLDING TOP FOR A PASSENGER CAR

[75] Inventors: Herbert May, Neudenau; Dieter Bauer, Leonberg; Matthias Aydt, Eberdingen, all of Germany

[73] Assignee: Dr. Ing. h.c.F. Porsche AG, Weissach, Germany

[21] Appl. No.: 08/871,687

[22] Filed: Jun. 9, 1997

[30] Foreign Application Priority Data

Jun. 7, 1996 [DE] Germany ............................ 196 22 953

[51] Int. Cl.⁶ ........................................................ B60J 7/12
[52] U.S. Cl. ................................. 296/107.09; 296/107.16
[58] Field of Search ........................... 296/107.09, 107.16

[56] References Cited

U.S. PATENT DOCUMENTS

| | | | |
|---|---|---|---|
| 1,826,399 | 10/1931 | Humer | 296/107.09 |
| 2,000,626 | 5/1935 | Votypka | 296/107.09 |
| 2,176,131 | 10/1939 | Haberstump | 296/107.09 |
| 2,833,593 | 5/1958 | Olivier et al. | 296/107.09 X |
| 3,203,729 | 8/1965 | Brynn et al. | 296/107.09 |
| 4,712,828 | 12/1987 | Albrecht | 296/107.09 X |
| 5,042,868 | 8/1991 | Nothaft et al. | 296/107.09 |
| 5,620,226 | 4/1997 | Sautter, Jr. | 296/107.09 X |
| 5,667,269 | 9/1997 | Prenger et al. | 296/107.09 |

FOREIGN PATENT DOCUMENTS

| | | |
|---|---|---|
| 0352428 | 1/1990 | European Pat. Off. . |
| 733270 | 2/1943 | Germany . |
| 4441666C1 | 12/1995 | Germany . |
| 388324 | 2/1933 | United Kingdom .............. 296/107.09 |

OTHER PUBLICATIONS

Patent Office Communication Mar. 19, 1997 DEX.
Excerpt from Deutsche Museum, 1981, vol. 1, pp. 72–73.
Search Report Oct. 1, 1997 Search Report.

*Primary Examiner*—Joseph D. Pape
*Attorney, Agent, or Firm*—Evenson, McKeown, Edwards & Lenahan, P.L.L.C.

[57] ABSTRACT

A folding top for a vehicle, particularly a passenger car, has a folding top structure and a folding top covering, in which case a large-surface forward folding top section is connected on its two longitudinal sides in each case by way of two control arms with folding top bearings and on laterally exterior areas of the dimensionally stable folding top section and on at least one control arm of each longitudinal side of the vehicle, roof frame sections are provided for fastening the folding top covering and sealing bodies. So that, in its sunk, rear-side deposited position, the folding top linkage requires as little space as possible, particularly in the vertical direction, it is provided that frame sections are provided on both control arms of the folding top structure in roof areas, in which case the roof frame sections of the forward folding top section and the roof frame sections of the control arms, in the closed position of the folding top, form a three-piece lateral roof frame which is mutually adjoined to be flush with the shell.

17 Claims, 5 Drawing Sheets

FOLDING TOP FOR A PASSENGER CAR

BACKGROUND AND SUMMARY OF THE INVENTION

This application claims the priority of German application 196 22 953.7 filed in Germany on Jun. 7, 1996, the disclosure of which is expressly incorporated by reference herein.

The invention relates to a folding top for a vehicle, particularly a passenger car. Certain preferred embodiments relate to a folding top wherein, on both control arms of respective longitudinal sides of the folding top structure, plural roof frame sections are provided such that roof frame sections of the forward folding top section and of the control arms form a three-part lateral roof frame mutually adjoining flush with the shell in the closed position of the folding top.

From German Patent Document DE 44 41 666 C1 a folding top for a passenger car is known in which case a large-surface, dimensionally stable folding top section arranged adjacent to the windshield frame is connected on its two longitudinal sides by way of two control arms respectively with a folding top bearing on the vehicle body side. On the dimensionally stable forward folding top section and on the exterior B-column control arm, one continuous roof frame section respectively is provided on which the folding top cover and the sealing body can be fixed.

It is an object of the invention to further develop the roof frame sections for fixing the folding top covering and the sealing bodies on a folding top structure of the initially mentioned type such that, in its sunk rear-side depositing position, the folding top linkage requires as little space as possible, particularly in the vertical direction.

According to the invention, this object is achieved by providing an arrangement wherein on both control arms of respective longitudinal sides of the folding top structure, plural roof frame sections are provided such that roof frame sections of the forward folding top section and of the control arms form a three-part lateral roof frame mutually adjoining flush with the shell in the closed position of the folding top.

Principal advantages achieved by means of the invention are that, because of the only section-type mounting of lateral roof frame sections on both control arms, the space requirement for the sunk rear-side depositing position of the folding top is significantly reduced, particularly in the vertical direction (flat construction). The deposited folding top harmonically matches the vehicle contour.

By means of the partial mounting of roof frame sections on both control arms of each longitudinal side of the vehicle, a three-piece lateral roof frame is formed so that also folding tops with a styling-caused, relatively long roof frame can be accommodated in a fully sunk manner in a rear-side receiving space.

A perfect sealing transition of the two roof frame sections which ensures the sealing function is ensured by the provided fixing device between the two control arms. At least the roof frame section on the forward control arm has an adjustable construction in order to ensure visually perfect connections to the roof frame sections disposed in front and behind.

Other objects, advantages and novel features of the present invention will become apparent from the following detailed description of the invention when considered in conjunction with the accompanying drawings.

DETAILED DESCRIPTION OF THE DRAWINGS

Figure 1:
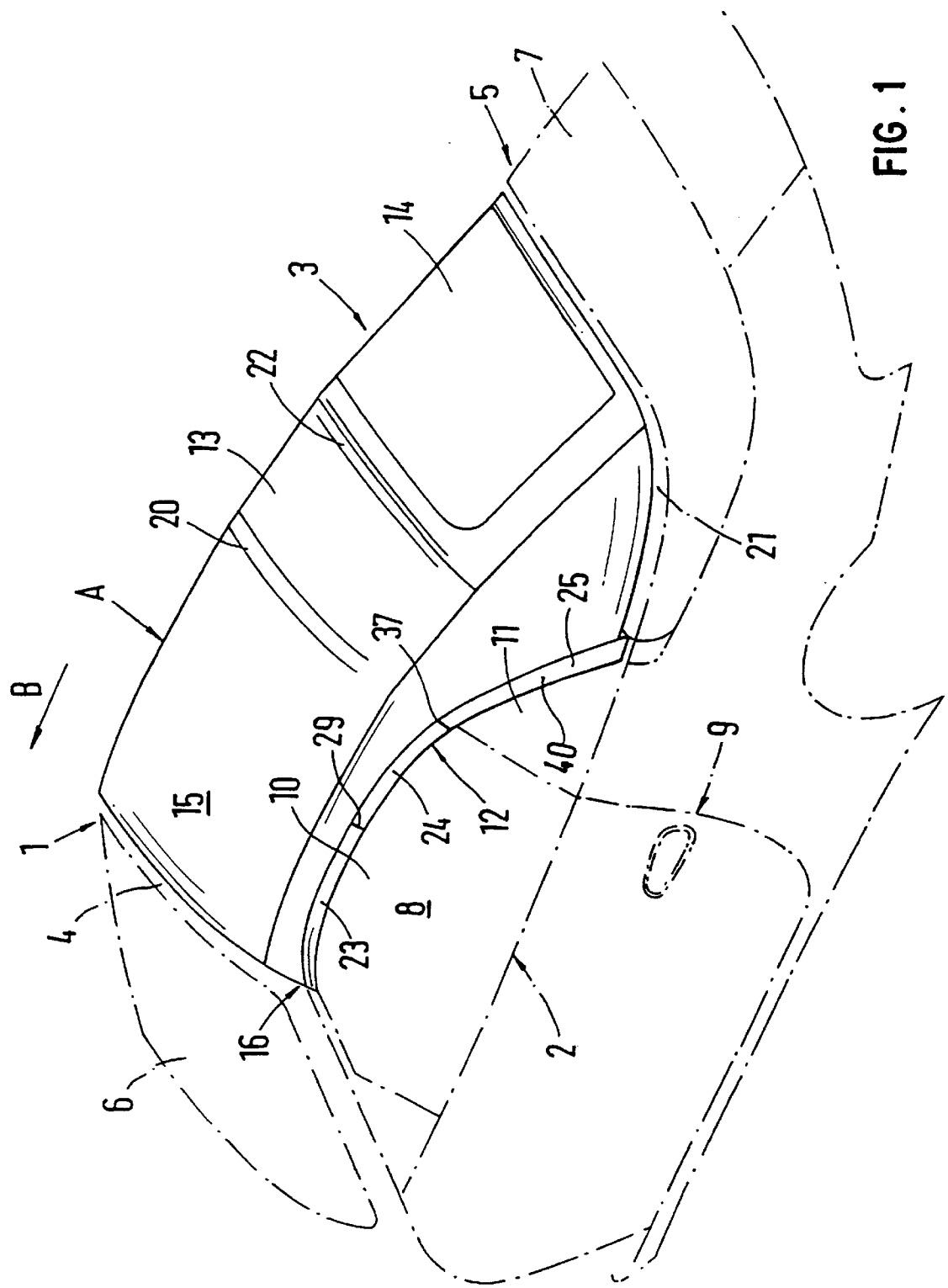
FIG. 1 is a perspective partial view diagonally from the rear of a vehicle with a folding top in the closed position, constructed according to a preferred embodiment of the invention.

FIG. 1 illustrates a partial area of a passenger car 1 which has a folding top 3 above a belt line 2. In a closed position A, the folding top 3 extends between a windshield frame 4 and a rear area 5 and is held releasably in position by at least one closure, which is not shown in detail, on the windshield frame 4. The windshield frame 4 accommodates a windshield 6. In the rear area 5, a swivellable folding top compartment lid 7 is illustrated which at least partially covers a folding top compartment disposed underneath. In the folded-back, rear-side deposited position, the folding top 3 is arranged in the folding top compartment in a sunk manner. A passenger compartment 8 of the passenger car 1 having 2+2 seats in the embodiment shown is accessible through side doors 9, the doors 9 having frameless door windows 10 constructed above the belt line 2. Lowerable rear side windows 11 adjoin the door windows 10.

The folding top 3 is composed of a folding top structure 12 and an elastic folding top covering 13 which is held in position on the folding top structure 12. In the rear area of the folding top covering 13, a viewing pane 14 is provided which is formed by a flexible or rigid rear pane.

The folding top structure 12 comprises essentially a large-surface, dimensionally stable folding top section 15 which is arranged adjacent to the windshield frame 4 and which, on its two laterally exterior longitudinal sides 16, is connected by two control arms 17, 18 respectively, which form a four-bar mechanism, with a folding top bearing 19 mounted on the vehicle body side.

The elongated folding top bearing 19 forms a supporting element of the vehicle structure on each longitudinal vehicle side and is therefore a reinforcing component in crash situations.

In addition, the folding top structure 12 comprises a main hoop 20 swivellably held on the two folding top bearings 19, a rear-side tension bow 21 connected with the main hoop 20 in an articulated manner, and a corner hoop 22. The corner hoop 22 is also swivellably disposed on the two folding top bearings 19. The corner hoop 22, the rear-side tension bow 21 and the main hoop 20 are kinematically decoupled and are controlled only by way of the fastening of the material of the folding top covering 13. For servicing work, the tension bow 21 can be folded up into an upright mounting position which is not shown in detail.

According to the invention, respective roof frame sections 23, 24, 25 are constructed on both longitudinal sides 16 of the passenger car 1 on the dimensionally stable folding top section 15 and on the two control arms 17, 18. The folding top covering 13 and sealing bodies 26, 27, 28 interacting with the door window 10 and the rearward side window 11 can be fixed to the roof frame sections 23, 24, 25.

Figures 2, 3:
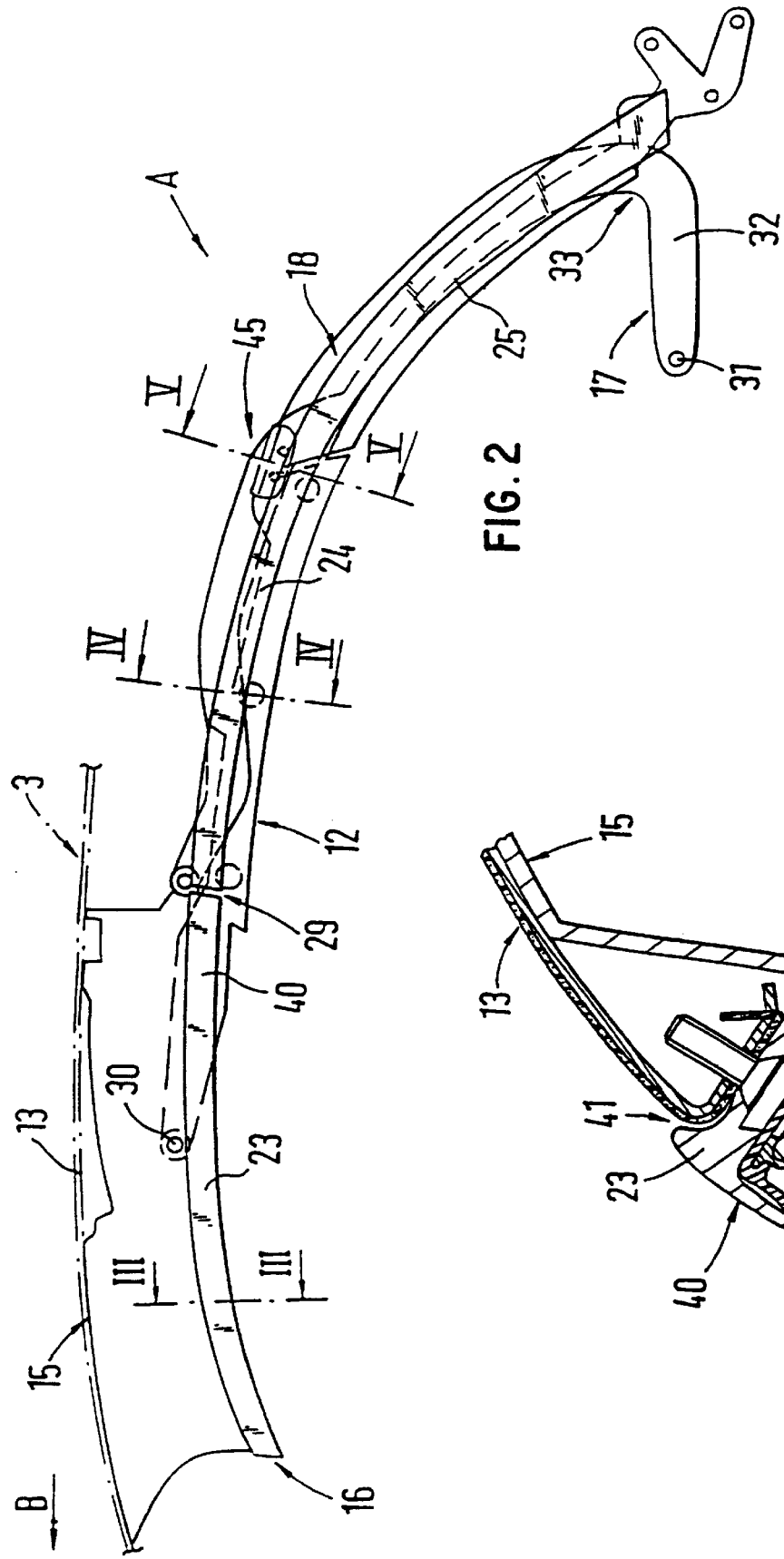
FIG. 2 is a partial lateral view of the folding top structure of FIG. 1, shown in the closed position of the folding top.
FIG. 3 is an enlarged sectional view taken along Line III—III of FIG. 2.

In the closed position of the folding top 3, the roof frame sections 23, 24, 25, which adjoin flush with the body shell, form a three-part lateral roof frame. The two roof frame sections 23, which are in front in the closed position A of the folding top 3, are constructed in one piece with the forward dimensionally stable folding top section 15 and, like that folding top section 15, are made of a light metal alloy (magnesium alloy) by casting (FIG. 3).

The forward roof frame sections 23 extend essentially along the whole longitudinal course of the dimensionally stable folding top section 15.

The roof frame section 24, which—viewed in the driving direction B—is provided on the forward control arm 17, is arranged such that, in the closed position A of the folding top 3, while forming a narrow first gap 29, it adjoins the rear edge of the forward roof frame section 23—in an alignment with it. The gap 29 extends in the upright direction and extends diagonally upwards toward the rear.

Figure 4:
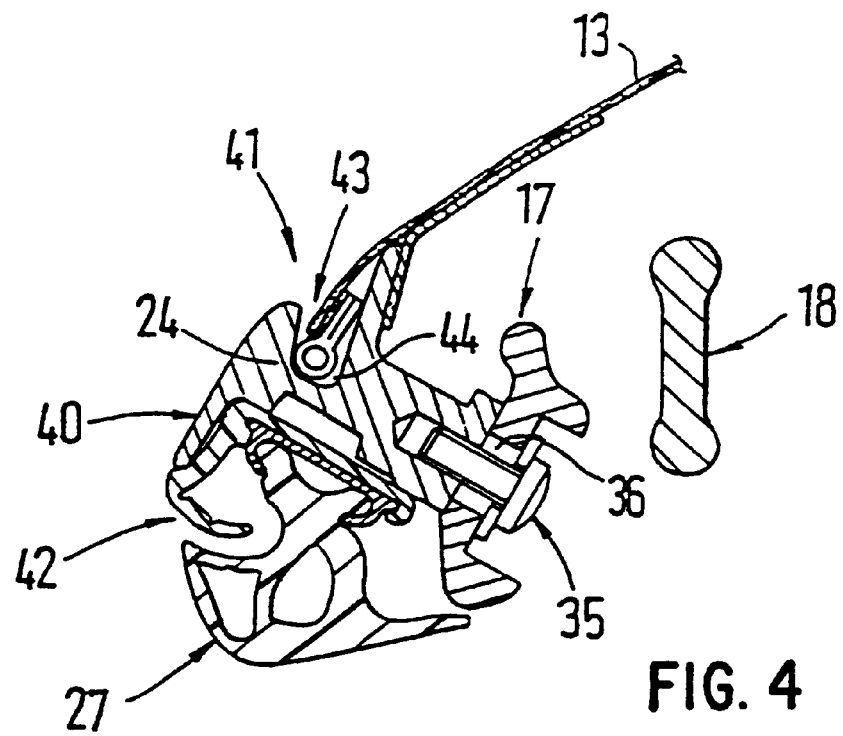
FIG. 4 is an enlarged sectional view taken along Line IV—IV of FIG. 2.

The forward control arm 17 is connected by means of its one end 30 in an articulated manner with the dimensionally stable folding top section 15 and, by means of its other end 31, is connected with the folding top bearing 19. Adjacent to the folding top bearing 19, the control arm 17 has a first short linear section 32 which changes by way of a transition area 33 to a second elongated section 34, in which case the section 34 has a curved shape. The roof frame section 24, which forms the center part of the lateral roof frame is formed by a casting made of a light metal alloy and is adjustably connected with the control arm 17. According to FIG. 4, this can take place, for example by means of fastening screws 35. For the adjustability in the vertical direction, openings 36 on the control arm 17 have a significantly larger diameter than the diameter of the fastening screws 35.

The roof frame section 25 which—viewed in the driving direction B—is provided on the rearward control arm 18, is arranged such that, in the closed position A of the folding top 3 while forming a narrow second gap 37, it adjoins the rearward and of the roof frame section 24 of the forward control arm 27—in an alignment thereto—. The rearward roof frame section 25 is also formed by a separate part made by casting from a light metal alloy which part is releasably and, as required, adjustably connected with the control arm 18.

By means of its one end 38, the rearward control arm 18 is connected to the rearward edge of the dimensionally stable folding top section 15 and, by means of its other end 39, is rotatably connected to the folding top bearing 19. On each longitudinal side of the folding top 3, the ends 30, 31, 38, 39 form a four-bar mechanism (parallelogram).

In a laterally exterior area, the roof frame sections 23, 24, 25 in sections form a shell section 40 of the vehicle body which is not surrounded by the folding top covering 13 but is exposed. The fastening sections 41, 42 for the folding top covering and the sealing bodies 26, 27, 28 are constructed separately from one another on the roof frame sections 23, 24, 25.

In the closed position A of the folding top 3, the folding top covering 13 projects behind the dimensionally stable folding top section 15 by means of an edge area 43 into a groove-shaped recess 44 of the roof frame sections 24, 25, the recess 44 being constructed on the top side of the roof frame sections 24, 25. The area of the roof frame sections 23, 24, 25 which forms a shell section 40 extends between the upper fastening section 41 for the folding top covering 13 and the lower fastening section 42 for the sealing bodies 26, 27, 28, in which case this surface forms a styling surface which widens continuously from the front toward the rear (FIG. 1).

In the transition area 45 of the two roof frame sections 24, 25, a fixing device 46 is locally provided which ensures a positioning in the Y-direction of the two separate sealing bodies 27, 28.

Figure 5:
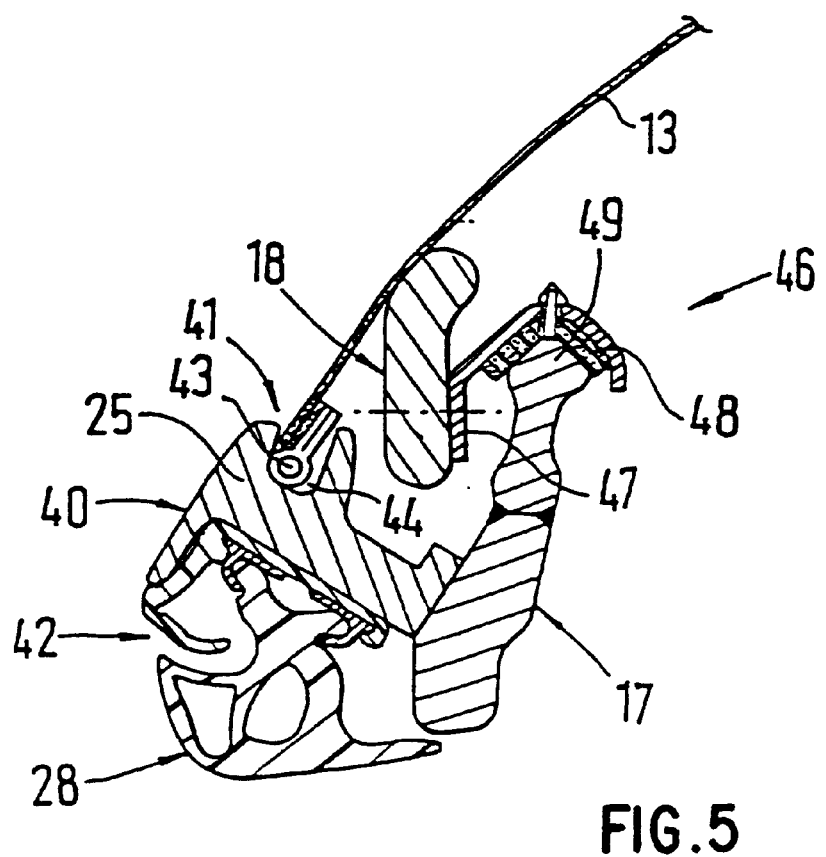
FIG. 5 is an enlarged sectional view taken along Line V—V of FIG. 2.
Figure 6:
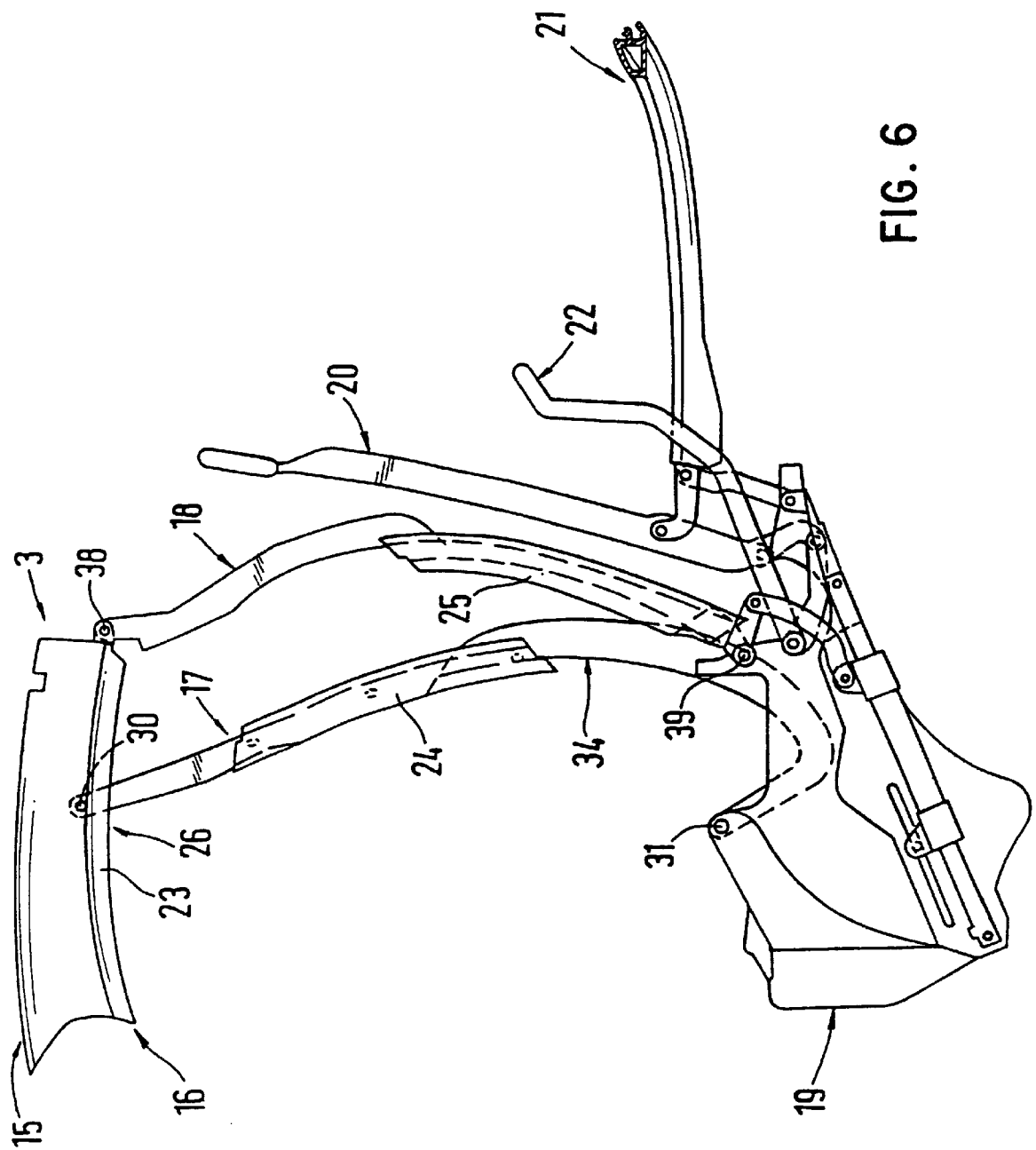
FIG. 6 is a partial lateral view of the folding top structure of FIGS. 1–5, shown in a partially folded-back intermediate position.
Figure 7:
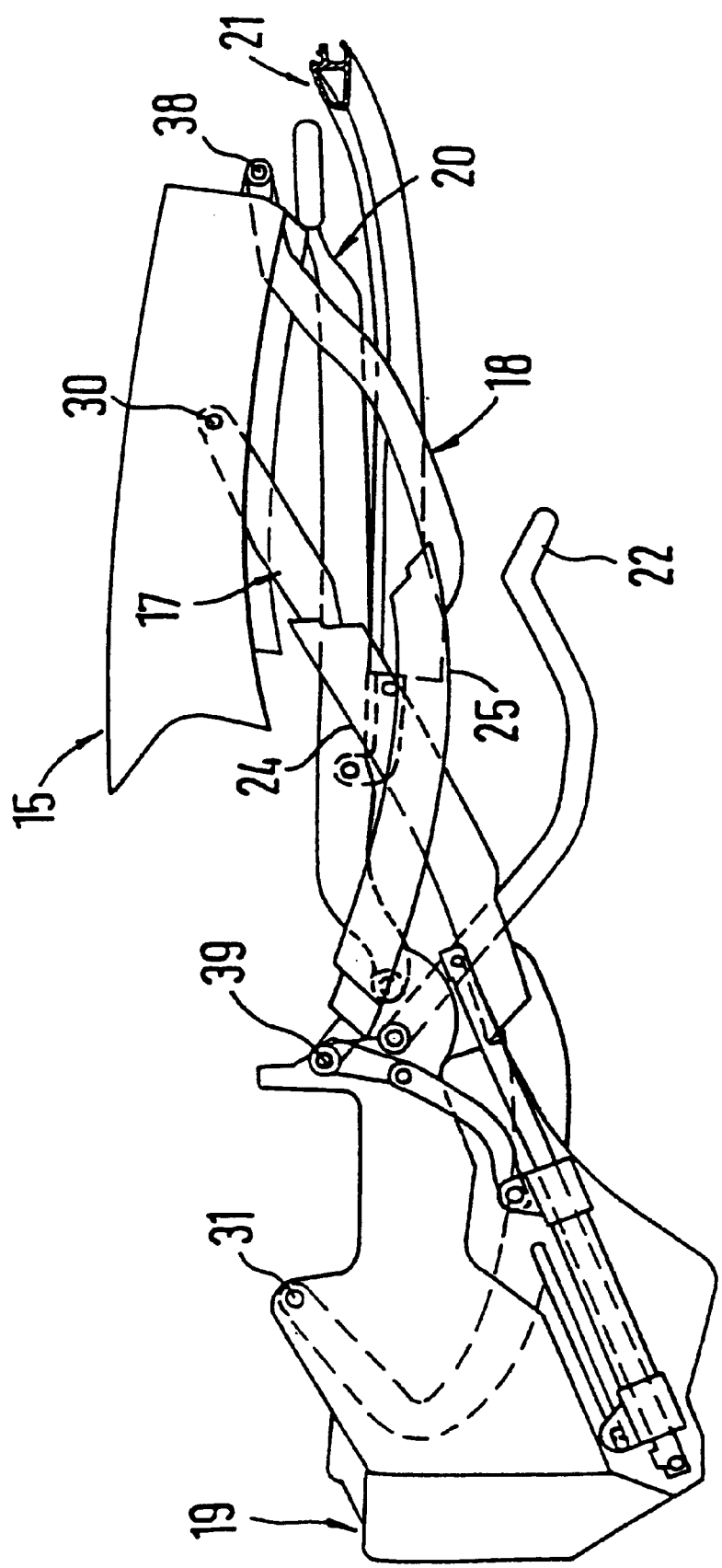
FIG. 7 is a partial lateral view of the folding top structure of FIGS. 1–6 in the rear-side deposited position.

The fixing device 46 comprises a profiled holder 47 which is fastened on the interior side of the rearward control arm 18 and has a locally mounted elastic layer 48 (rubber part) which, in the closed position of the folding top 3, form-lockingly reaches around the upper edge 49 of the froward control arm 17 which is disposed underneath. By means of fastening screws, which are not shown in detail, the holder 47 is adjustably connected with the control arm 18 (FIG. 5).

In the closed position A of the folding top 3, the two control arms 17, 18—in the lateral view—extend in sections approximately mutually in the same direction, whereas, in the top view, they extend at a lateral distance with respect to one another.

In the embodiment shown, the control arms 17, 18 are constructed as forged steel parts.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top for a vehicle comprising, a folding top structure, a folding top covering, including a dimensionally stable forward folding top section extending adjacent a windshield frame toward a rear end of the vehicle, the top section having two longitudinal sides, with at least one control arm connected to each respective side thereby forming a four-bar mechanism, each control arm having an end pivotally connected to a respective folding top bearing mounted on each side of the vehicle body, and a plurality of roof frame sections positioned along lateral exterior areas of the dimensionally stable folding top section and the at least one control arm, said roof sections being arranged for fastening the folding top covering and a plurality of sealing bodies, wherein, plural roof frame sections are positioned on the at least one control arm of respective longitudinal sides of the folding top structure such that said roof frame sections of the dimensionally stable forward folding top section and of the at least one control arm form a three-part lateral roof frame mutually adjoining in a closed position of the folding top.

2. Folding top according to claim 1, wherein said at least one control arm at each side includes a forward and a rearward control arm, and wherein, viewed in a vehicle forward driving direction, the roof frame section provided on the forward control arm is arranged such that, in the closed position of the folding top, while forming a narrow first gap, it adjoins in an aligned manner a roof section of the dimensionally stable forward folding top section.

3. Folding top according to claim 2, wherein, viewed in the forward vehicle driving direction, the roof frame section provided on the rearward control arm is arranged such that, in the closed position of the folding top, while forming a narrow second gap, adjoins in an aligned manner the roof frame section of the forward control arm.

4. Folding top according to claim 1, wherein a fixing device is provided between the at least one control arm on each side in a transition area of the at least one control arm on respective roof frame sections, by which fixing device the sealing bodies of the at least one control arm on each side are aligned with one another in a vehicle longitudinal direction in the correct position.

5. Folding top according to claim 3, wherein a fixing device is provided between the at least one control arm on each side in a transition area of the at least one control arm on respective roof frame sections, by which fixing device the sealing bodies of the at least one control arm on each side are aligned with one another in a vehicle longitudinal direction in the correct position.

6. Folding top according to claim 4, wherein the fixing device comprises a holder which is fastened on an interior side of a rearward control arm and has a locally mounted elastic layer which, in the closed position of the folding top, form-lockingly reaches around an upper edge of a forward control arm.

7. Folding top according to claim 5, wherein the fixing device comprises a holder which is fastened on an interior side of a rearward control arm and has a locally mounted elastic layer which, in the closed position of the folding top, form-lockingly reaches around an upper edge of a forward control arm.

8. Folding top according to claim 1, wherein the roof frame sections mounted on the at least one control on each side are formed by diecast parts made of a light metal alloy, the roof frame sections being held in position on the control arms by means of fastening screws.

9. Folding top according to claim 2, wherein the roof frame sections mounted on the at least one control on each side are formed by diecast parts made of a light metal alloy, the roof frame sections being held in position on the control arms by means of fastening screws.

10. Folding top according to claim 3, wherein the roof frame sections mounted on the at least one control on each side are formed by diecast parts made of a light metal alloy, the roof frame sections being held in position on the control arms by means of fastening screws.

11. Folding top according to claim 4, wherein the roof frame sections mounted on the at least one control on each side are formed by diecast parts made of a light metal alloy, the roof frame sections being held in position on the control arms by means of fastening screws.

12. Folding top according to claim 7, wherein the roof frame sections mounted on the at least one control on each side are formed by diecast parts made of a light metal alloy, the roof frame sections being held in position on the control arms by means of fastening screws.

13. A passenger car folding top assembly including a folding frame structure for one side of a folding top, comprising:

a first top covering support frame member extending rearwardly from a vehicle windshield frame, a second top covering support frame member extending adjacent to and rearwardly of the first top covering support frame member, a third top covering support frame member extending adjacent to and rearwardly of the second top covering support frame member, a forward control arm pivotally connected at one end at a first position to the first top covering support frame member and at an opposite end to a fixed vehicle bearing support, and a rearward control arm pivotally connected at one end at a second position, behind the first position, to the first top covering support frame member and at an opposite end to the fixed vehicle bearing support, wherein said second top covering support frame member is fixed to the forward control arm and said third top covering support frame member is fixed to the rearward control arm.

14. A passenger car folding top assembly according to claim 13, wherein said frame members and control arms are arranged to be pivotally moved from a vehicle top closed position with said frame members arranged end to end adjacent one another, to a vehicle top stowed position with said frame members stacked vertically.

15. A passenger car folding top assembly according to claim 14, wherein the roof frame sections mounted on the control arms are formed by diecast parts made of a light metal alloy, the roof frame sections being held in position on the control arms by means of fastening screws.

16. A passenger car folding top assembly according to claim 13, including a second folding frame structure at the other side of the folding top.

17. A passenger car folding top assembly according to claim 16, including a flexible folding top covering fixed to the support frame members.

* * * * *